US006506547B1

(12) United States Patent
Robertson et al.

(10) Patent No.: US 6,506,547 B1
(45) Date of Patent: Jan. 14, 2003

(54) ROLL PACKAGE

(75) Inventors: Jeffrey C. Robertson, Rochester, NY (US); Thomas F. Falls, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/211,597

(22) Filed: Dec. 14, 1998

(51) Int. Cl.[7] .......................... G03C 3/00; B65D 85/672; G03B 17/26

(52) U.S. Cl. .......................... 430/501; 206/416; 206/455; 242/348.4

(58) Field of Search .......................... 430/501; 206/316.1, 206/410, 416, 455; 242/348.4

(56) References Cited

U.S. PATENT DOCUMENTS

| | | | | |
|---|---|---|---|---|
| 1,261,747 A | | 4/1918 | McCurdy | 430/501 |
| 1,454,812 A | | 5/1923 | Jones | 430/501 |
| 1,454,813 A | | 5/1923 | Jones | 430/500 |
| 1,454,814 A | | 5/1923 | Jones | 430/501 |
| 1,687,044 A | | 10/1928 | Sulzer | 430/501 |
| 2,005,405 A | | 6/1935 | Wittel | 242/584.1 |
| 3,338,399 A | | 8/1967 | Burt | 206/395 |
| 4,780,357 A | * | 10/1988 | Akao | 428/216 |
| 4,784,906 A | * | 11/1988 | Akao | 428/324 |
| 4,912,103 A | | 3/1990 | Sibbach et al. | 428/215 |
| 5,118,563 A | | 6/1992 | Akao | 428/334 |
| 5,452,797 A | * | 9/1995 | Pollard | 206/416 |
| 5,655,659 A | | 8/1997 | Kennedy | 206/455 |
| 5,934,592 A | * | 8/1999 | Makino | 242/348.4 |
| 6,196,484 B1 | * | 3/2001 | Hosaka et al. | 242/160.4 |

FOREIGN PATENT DOCUMENTS

| | | | |
|---|---|---|---|
| EP | 0 291 098 A | 11/1988 | B32B/15/08 |
| EP | 0 416 538 A2 | 3/1991 | G03B/17/26 |
| EP | 0 508 489 A2 | 10/1992 | B32B/7/02 |
| EP | 0 573 782 A2 | 12/1993 | B32B/27/08 |
| WO | WO 96/00149 A | 1/1996 | B32B/27/00 |

OTHER PUBLICATIONS

Monax®Plus, by Tredegar Industries.

* cited by examiner

*Primary Examiner*—Janet Baxter
*Assistant Examiner*—Amanda C. Walke
(74) *Attorney, Agent, or Firm*—Susan L. Parulski; Clyde E. Bailey, Sr.

(57) ABSTRACT

A roll package comprising a spool, a length of web material wound about the spool, and a length of a protective material wound about the length of web material. The length of a protective material has a moisture vapor transmission rate of less than about 0.1 grams per one hundred square inches for 24 hours when tested at 100 degree F., 100 percent relative humidity. In a particular embodiment, the spool includes a core and a pair of flanges, each flange having an outwardly facing surface and an inwardly facing surface, the inwardly facing surface of each flange including a substantially planar portion adjacent an outer edge of the flange and a recessed portion inboard of the substantially planar portion. Edges of the protective material abut the substantially planar portion when wound about the length of web material such that the edges are held in intimate contact with the substantially planar portion to form a light seal barrier and a moisture vapor barrier seal.

16 Claims, 5 Drawing Sheets

ROLL PACKAGE

FIELD OF THE INVENTION

The present invention relates generally to packages for rolls of web material, particularly photographic film rolls, film packs, and other rolls of light sensitive material. The present invention is more particularly directed to a roll package which is protected from light and includes moisture barrier protection.

BACKGROUND OF THE INVENTION

Rolls of light sensitive web material (such as paper and film) require light-tight packaging so that such rolls are not exposed to white or room light whereby the light sensitive characteristics of the rolls would be damaged. While such packaging must be light-tight, such packaging needs to facilitate the loading of the rolls in room light into cooperating apparatus which dispense or otherwise use the web material, such as a camera. Further, once positioned within the cooperating apparatus, the packaging must not adversely affect the operation of the roll during unwinding, and must not interfere with the roll if the web material is re-wound.

U.S. Pat. No. 5,655,659 (Kennedy), commonly assigned and incorporated herewith by reference, relates to a light-tight package for a roll of web material wherein an opaque leader portion is wound around the roll. End disks are attached to the end surfaces of the roll to form a light-tight package. While such a package has been suitable for its intended purpose, such packaging is not suited for a web material wound onto a spool having end flanges.

U.S. Pat. Nos. 1,454,812 (Jones), 1,454,813 (Jones), and 1,454,814 (Jones), all commonly assigned and incorporated herewith by reference, relate to a roll package wherein the web material is wound onto a spool having end flanges. As shown in FIG. 1, a spool 10 includes a core 12 and a pair of flanges 14,16 disposed at opposite ends of core 12. Web material W is wound between the flanges. An opaque leader 18 attached to web material W and wound about the web material to protect the web material from light.

Various packaging configurations have been developed to improve the protection of the web material from light. For example, as shown in FIG. 2, a roll package includes a leader 20 disposed at one end of the web material, and a trailer 22 disposed at the other end of the web material, with the trailer being attached to spool 10. Accordingly, when web material W is wound about spool 10 between end flanges 14,16, first the trailer is wound, then the web material is wound, with the leader being wound about the web material. Such a roll packaging configuration (i.e., trailer/web/leader) is available in a type of film package generally referred to as a 220 format film package.

In another roll packaging configuration, illustrated in FIG. 3 and generally referred to as a 120 format film package, a backing material 24 is disposed on one side of the web material along the entire length of the web material, with a length of backing material 24 being greater than the length of the web material. The backing material may be attached to one end of the web material. Accordingly, when the web material and backing material are wound onto the spool between the end flanges, the wound convolutions alternate between the web material and backing material.

In addition to protecting the web material from light, the roll packaging configuration must protect the web material from moisture since moisture may adversely affect the characteristics of the web material. U.S. Pat. No. 1,261,747 (McCurdy) relates to photographic film rolls wherein a light-excluding paper is water-proofed, the water-proofing agent being a derivative of cellulose such as nitro-cellulose or cellulose acetate. This relates to a water-proofed paper which sheds water, such as water droplets, but is not a significant barrier to the transmission of water vapor. That is, when tested, this water-proofed paper would have a high moisture vapor transmission rate.

U.S. Pat. No. 1,687,044 (Sulzer), commonly assigned and incorporated herein by reference, relates to a leader consisting of paper drawn through varnish. Like McCurdy, Sulzer varnished paper would have a high moisture vapor transmission rate.

Indeed, roll packaging taught by McCurdy and/or Sulzer has traditionally been packaged within a foil-laminate barrier pouch (i.e., bag) to ensure adequate protection against moisture vapor, as the moisture barrier properties of the water-proofed papers has been inadequate to restrict water vapor transmission.

While such packaging may have achieved certain degrees of success in their particular applications, a need continues to exist for an improved roll packaging configuration which would ensure protection from light, particularly during rugged handling/shipping conditions. The improved roll packaging configuration would also provide a low moisture vapor transmission rate.

SUMMARY OF THE INVENTION

An object of the present invention is to provide a roll package which protects a web material from light.

Another object of the invention is to provide such a roll package that has a low moisture vapor transmission rate.

Still another object of the invention is to provide such a roll package that is easily opened by a user.

Yet another object of the invention is to provide such a roll package that does not require additional packaging to provide adequate moisture vapor barrier protection.

These objects are given only by way of illustrative example. Thus, other desirable objectives and advantages inherently achieved by the disclosed invention may occur or become apparent to those skilled in the art. The invention is defined by the appended claims.

According to one aspect of the present invention, there is provided a roll package comprising a spool having a core and a flange disposed at opposite ends of the core; a length of web material wound about the core between the flanges; and a length of a protective material wound about the wound length of web material. The protective material has a moisture vapor transmission rate of less than about 0.1 grams per one hundred square inches for 24 hours when tested at 100 degree F., 100 percent relative humidity. In a particular embodiment, the protective material is a laminate having a first layer adhered to a second layer with the first layer being comprised of a compression rolled high density polyethylene and the second layer being comprised of a rubber-modified high density polyethylene. In a preferred embodiment, the first layer is comprised of a compressed, high density polyethylene, e.g., MONAX® PLUS, manufactured by Tredegar Industries.

According to another aspect of the present invention, there is provided a roll package comprising a spool having a core and a flange disposed at opposite ends of the core; a length of web material wound about the core between the flanges; and a length of a protective material wound about the wound length of web material. Each flange has an outwardly facing surface and an inwardly facing surface, the inwardly facing surface of each flange including a substantially planar portion adjacent an outer edge of the flange and a recessed portion inboard of the substantially planar portion. The protective material has a moisture vapor transmission rate of less than about 0.1 grams per one hundred square inches for 24 hours when tested at 100 degree F., 100 percent relative humidity.

The present invention provides a roll package which provides protection from light, and moisture barrier protection. In addition, the roll package of the present invention is readily opened by a user.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
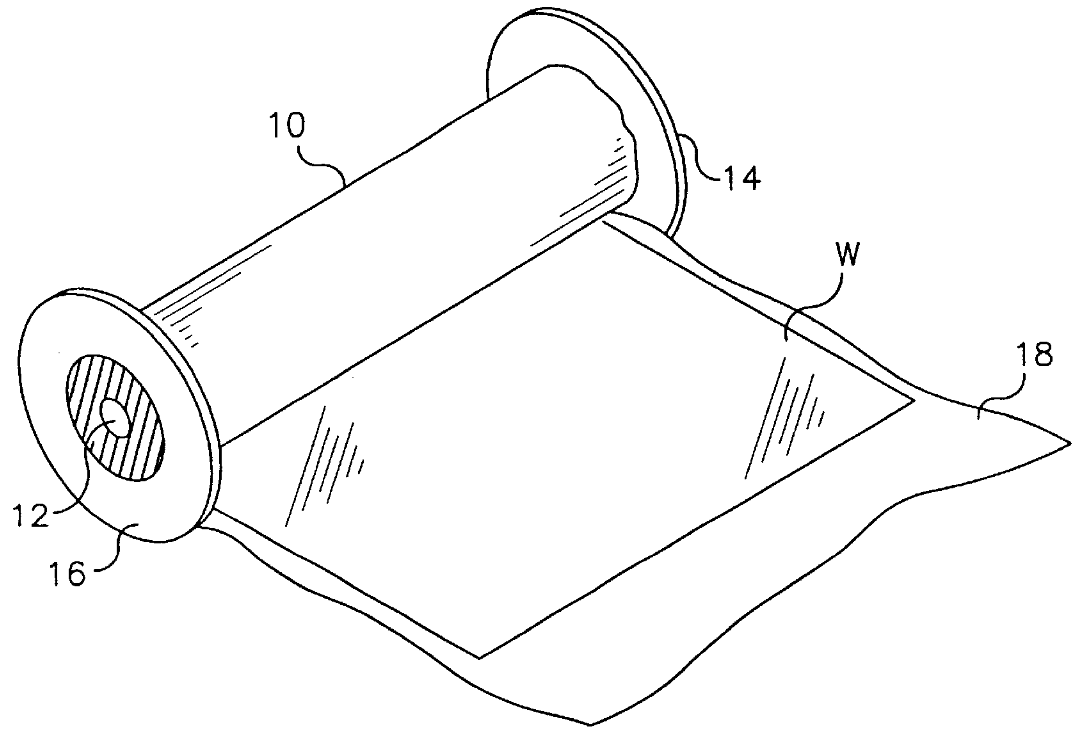
FIG. 1 (PRIOR ART)
FIG. 1 shows a perspective view of a prior art roll package including a spool having a core and a pair of end flanges, a web material, and an opaque leader attached to web material.
Figure 2:
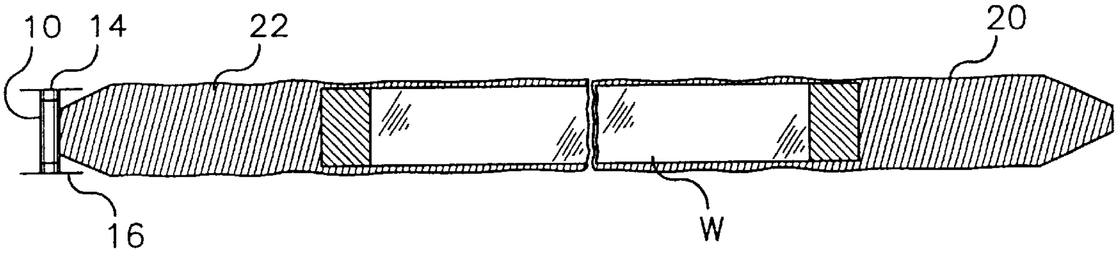
FIG. 2 (PRIOR ART)
FIG. 2 shows a top view of a prior art roll package including a spool, a trailer, web material, and a leader.
Figure 3:
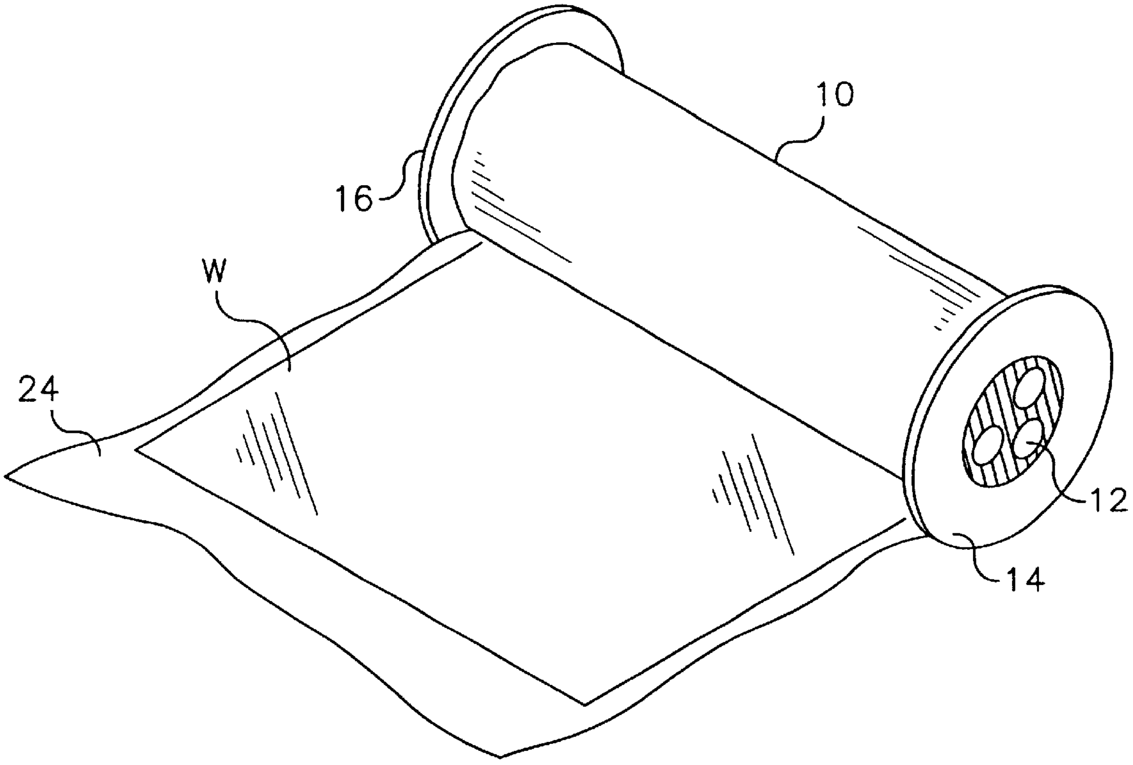
FIG. 3 (PRIOR ART)
FIG. 3 shows a side elevation of a prior art roll package configuration including a backing material.

The following is a detailed description of the preferred embodiments of the invention, reference being made to the drawings in which the same reference numerals identify the same elements of structure in each of the several figures.

As mentioned above, photosensitive web material, such as photographic film, is adversely affected by water/moisture. Accordingly, as discussed above, prior art references teach a protective material which is waterproofed. The term "waterproof" refers to the ability to be impervious to water. That is, the material is able to shed droplets of water. Therefore, such waterproofed material protects the web material from water which might contact the roll package. Such water might occur from rain during transport/shipping/handling. However, water is inherent in the atmosphere as vapor. Vapor, if absorbed by the web material, can adversely affect the photosensitive characteristics of photosensitive web material. In addition, for web material wound about a plastic spool, the plastic spool provides a path for light to reach the web material. This spool also provides a path for vapor to reach the web material. While the prior art refers to the light-shielding material (or other protective material) as being waterproofed, the light-shielding material does not provide water vapor barrier protection. That is, the prior art light-protective material does not provide protection from vapor.

Figure 4:
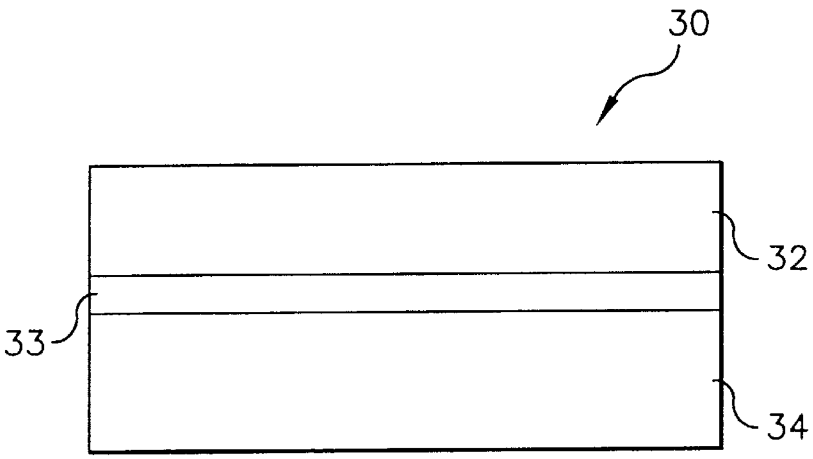
FIG. 4 shows a side elevation of a protective material in accordance with the present invention in a partially unwound orientation.

The present invention provides such moisture vapor barrier protection. Applicants have unexpectedly discovered a layered material 30 in accordance with the present invention for use as a protective material which provides such moisture vapor barrier protection in addition to providing light-shielding capabilities. Layered material 30 is generally illustrated in FIG. 4 as a laminate having a first layer 32 adhered to a second layer 34. Layered material 30 has a moisture vapor transmission rate of less than about 0.1 grams per one hundred square inches for 24 hours when tested at 100 degree F., 100 percent relative humidity. Preferably, layered material 30 has a moisture vapor transmission rate of less than about 0.05 grams per one hundred square inches for 24 hours when tested at 100 degree F., 100 percent relative humidity. Moisture vapor transmission rate is defined as the mass of moisture (in grams) which passes through an area of 100 square inches of the material during a period of 24 hours, when the relative humidity of one side of the material is maintained at 100 percent, and the other side of the material is maintained at zero percent relative humidity, and the temperature of the environment is maintained at 100 degrees F.

Applicants have found a suitable layered material 30 to be comprised of a layer of a compression rolled high density polyethylene adhered to a layer of rubber-modified high density polyethylene. An example of a compression rolled high density polyethylene is Monax ®Plus, which is manufactured by Tredegar Industries. The two layers comprising layered material 30 may be adhered by methods known to those skilled in the art, such as by poly extrudent 33, or by a single or two-part adhesive 33. Light-shielding protection is provided by layered material 30 being opaque, such as providing an opaqueness to at least one of first or second layers 32,34.

Other suitable materials for first layer 32 include a metalized polyester, a metalized high density polyethylene, a metalized polycarbonate, or other high stiffness materials which provide high moisture vapor barrier protection (i.e., a low moisture vapor transmission rate). Other suitable materials for second layer 34 include medium to low density polyethylenes, ethylene vinyl acetates, ethylene acrylic acetates, or other softer low modulus materials.

Various thicknesses of layers 32,33,34 may be used to provide the moisture vapor transmission rate as described above. For example, a 2 mil thick layer of Monax ®Plus in combination with a 2 mil thick layer of rubber-modified high density polyethylene has been found suitable. Another example is a 2 mil thick layer of Menax ®Plus in combination with a 1.5 mil thick layer of rubber-modified high density polyethylene and a 1.5 mil thick layer of low density polyethylene.

Layered material 30 can be used as a leader, trailer, backing material, or combination thereof as described above with regard to the various roll package configurations. While Applicants have described layered material 30 as having three layers 32,33,34, those skilled in the art will recognize that additional layers may possibly be used within the scope of the present invention. For illustrative purposes only, layered material 30 will herein be described as a backing material in an example with the 120 format film package configuration. Those skilled in the art will recognize that layered material 30 can be used in other roll package configurations as a protective material.

Figure 5:
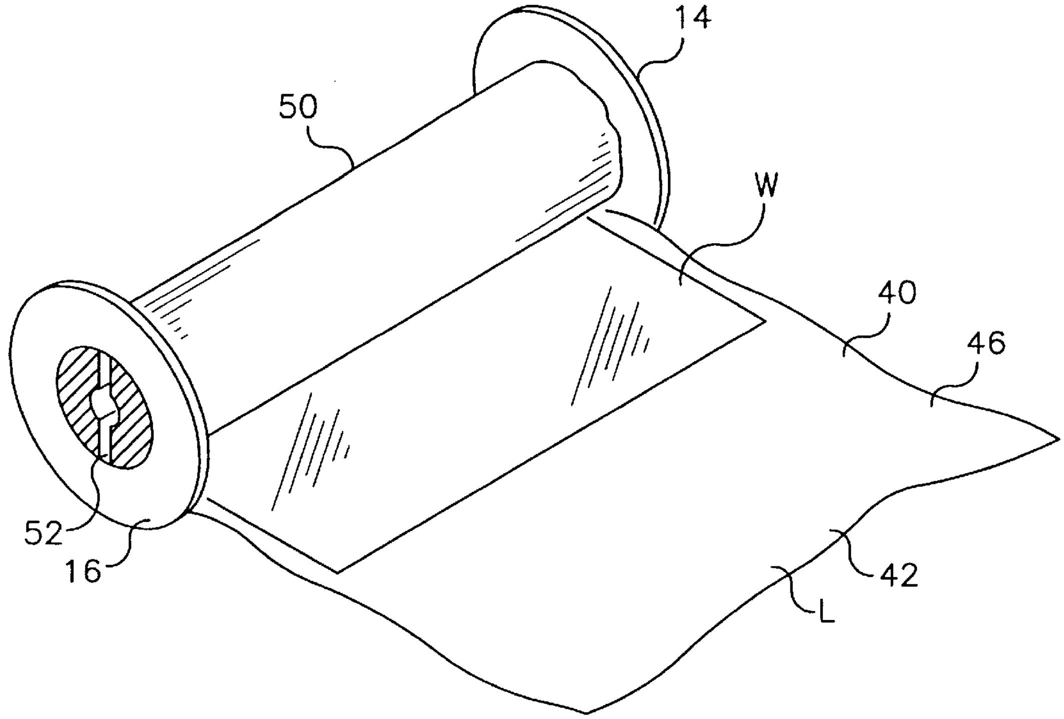
FIG. 5 shows a perspective view of a roll package in accordance with the present invention.
Figure 6:
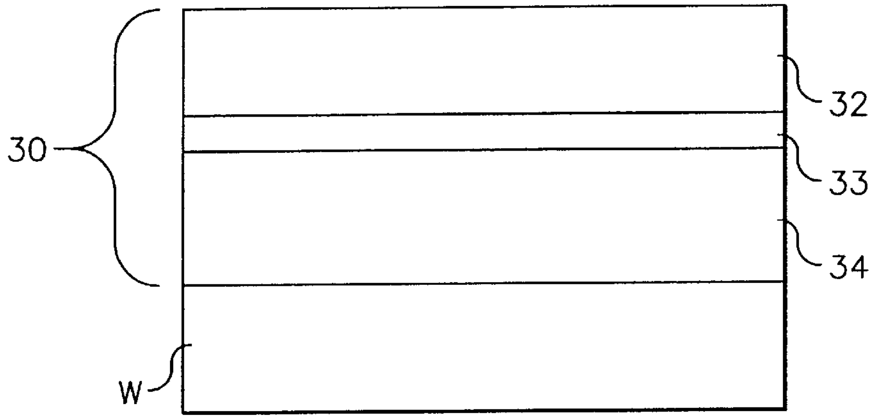
FIG. 6 shows a side elevation of the web material and protective material taken along Line 6—6 of FIG. 5.
Figure 7:
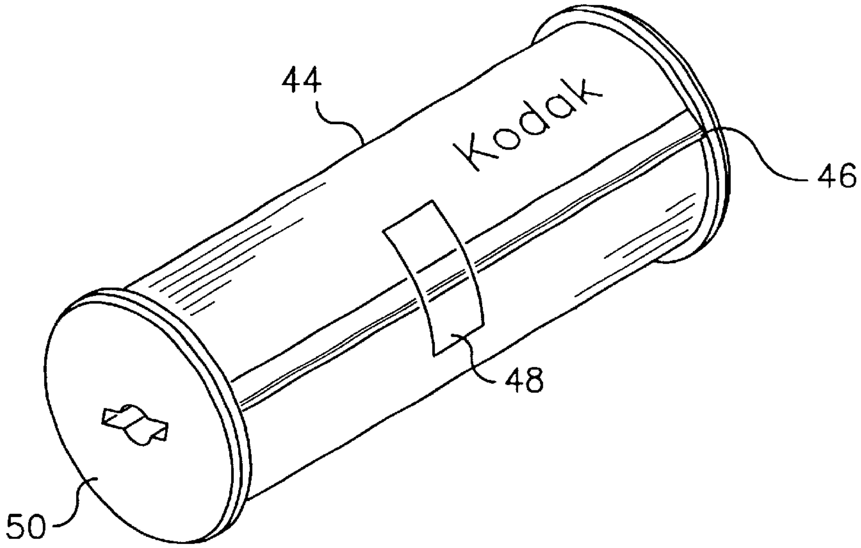
FIG. 7 shows a perspective view of a roll package in accordance with the present invention in a fully wound orientation.

As mentioned above and now illustrated in FIG. 5, 120 format film package includes a backing material 40 disposed on one side of web material W along the entire length of the web material. The length of backing material 40 is greater than the length of the web material such that an extending portion 42 (herein after referred to as leader L) of backing material 40 extends beyond the length of the web material. Typically, an extending portion (not shown in FIG. 5; illustrated in FIG. 10) (herein after referred to as trailer T) is located at the other end (i.e., adjacent the spool) to provide protection for the web material when the web material is wound after exposure in a cooperating apparatus. In addition, the width of backing material 40 is greater than the width of the web material. Backing material 40 is comprised of layered material 30. As illustrated in FIG. 6, backing material 40 is disposed on one side of the web material such that second layer 34 abuts the web material. Accordingly, when the web material and backing material 40 are wound about a spool, first layer 32 forms an outer surface 44 of the roll package, generally shown in FIG. 7. An edge 46 of backing paper 40 can be adhered to outer surface 44 by methods known to those skilled in the art, 20 for example, by an adhesive strip 48.

First layer 32 has a printable surface, thus, characters can be formed on outer surface 44 of the roll package. Such characters might include a logo, pictorial information, a company name, expiration date information, or advertisements.

Figure 8:
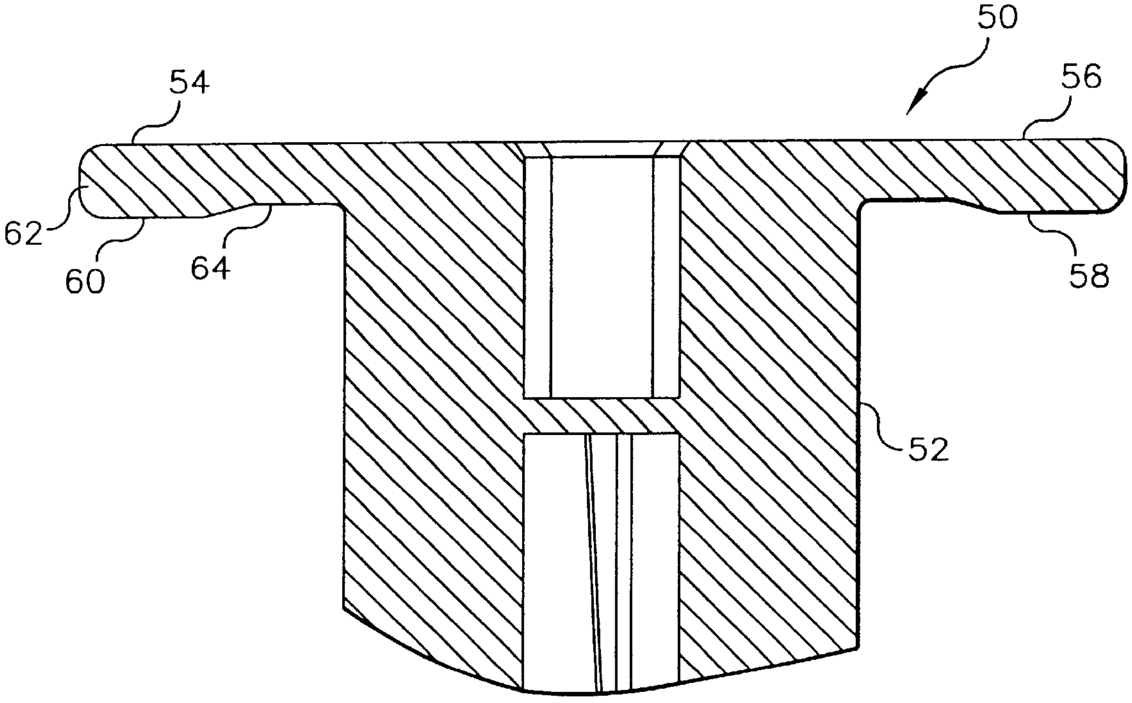
FIG. 8 shows a cross-sectional view of one end of a spool in accordance with the present invention.

A spool 50 about which the web material and backing material 40 is wound is generally illustrated in FIG. 8. Spool 50 has a core 52 and a flange disposed at opposite ends of the core. For illustrative purposes only, one flange 54 is shown. Each flange includes an outwardly facing surface 56 and an inwardly facing surface 58. Inwardly facing surface 58 of each flange includes a substantially planar portion 60 adjacent an outer edge 62 of the flange. Each inwardly facing surface 58 further includes a recessed portion 64 inboard of substantially planar portion 60.

Figure 9:
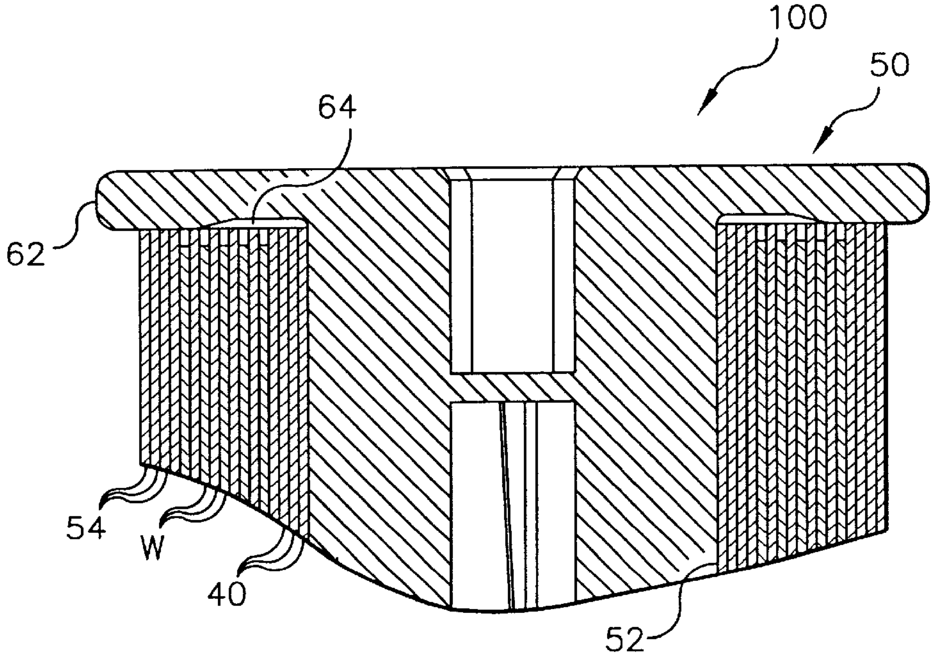
FIG. 9 shows a cross-sectional view of one end of a roll package in accordance with the present invention, taken along the longitudinal axis of the spool.
Figure 10:
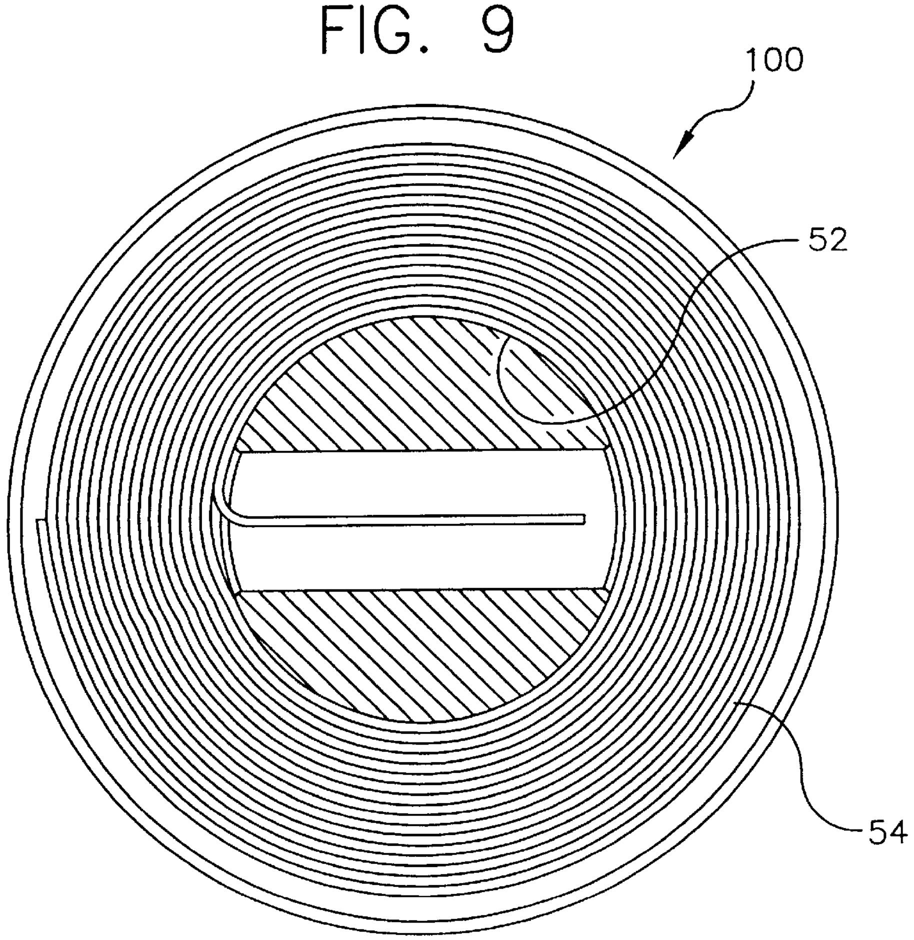
FIG. 10 shows a cross-sectional view of a roll package in accordance with the present invention, taken through the core along an axis perpendicular to the longitudinal axis of the spool.

To form a roll package 100 in accordance with the present invention with the example of the 120 format film package configuration, several convolutions of trailer T of backing material 40 are wound about core 52 of spool 50, as illustrated in FIGS. 9 and 10. Note that the width of backing material 40 is less than the distance between the recessed portions of the two flanges. As roll package 100 is further formed, convolutions of alternating web material and backing material 40 are wound about core 52. Note that the width of the web material is less than the width of the distance between the recessed portions of the two flanges, and also less than the width of backing material 40.

When all the web material is wound about core 52, a plurality of convolutions 54 of leader L of backing material 40 are further wound about core 52. When the plurality of convolutions of leader L are further wound about core 52, the edges of the backing material of these convolutions are abutting substantially planar portion 60. Note that the width of backing material 40 is less than the distance between the recessed portions of the two flanges, and is slightly greater than the distance between the substantially planar portions of the two flanges such that when the backing material is wound between the flanges the edges of the backing material are held in intimate contact with the substantially planar portion. Accordingly, as will become more evident, the cooperation between the backing material and the substantially planar portion of the flanges forms a light seal barrier and a moisture vapor barrier seal. Layered material 30 has sufficient stiffness such that the edge of the backing material is pushed against the surface of the flange, forming an interaction between the backing material and the flange. The winding process (i.e., the forming of the convolutions) causes the edges of the backing material to wipe across substantially planar portion 60. The interference of the backing material with the substantially planar portion 60 results in a slight bending (or upturn) of the edges of the backing material against the substantially planar portion 60. This interaction might be compared to a wiper-blade moving across an automotive windshield. This wiper-blade type interaction results in a light-tight seal and moisture vapor barrier protection.

An interference of between about 0.005 to about 0.025 inches has been found suitable, preferably 0.015 inches. That is, the width of backing material 40 is about 0.005 to about 0.025 inches greater than the distance between the substantially planar portions of the two flanges.

When backing material bends as described above, the edge of second layer 34 is presented for intimate contact with substantially planar portion 60. Applicants selection of the rubber-modified high density polyethylene as second layer 34 provides a soft material which can readily deform or conform to any subtle imperfections in substantially planar portion 60, thereby providing for a moisture vapor barrier seal. This moisture vapor barrier seal is enhanced by the multiple convolutions which provide multiple wiper-blade contacts with substantially planar portion 60.

Substantially planar portion 60 preferably has a minimal surface roughness, for example, less than or about 5 to about 8 microinches. Such a surface uniformity has provided a suitable seal.

The material comprising spool 50 may also have a low moisture vapor transmission rate to prevent moisture permeability through the flanges. Examples may include thermoplastics such as high density polyethylene or polypropylene.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A roll package, comprising:

a spool having a core and a flange disposed at opposite ends of the core;

a length of web material layer wound about the core between the flanges; and a length of a protective material layer wound substantially entirely along the wound length of web material layer forming a plurality of alternating convolutions of said web material layer and said protective material layer, wherein nearest adjacent protective material layers in said plurality of alternating convolutions provide a combined light and moisture resistant barrier for said web material layer sandwiched therebetween.

2. The roll package according to claim 1 wherein the protective material layer has a moisture vapor transmission rate of less than about 0.05 grams per one hundred square inches for 24 hours when tested at 100 degree F., 100 percent relative humidity.

3. The roll package according to claim 1 wherein the protective material layer is a laminate having a first layer adhered to a second layer, the first layer being comprised of a compression rolled high density polyethylene, the second layer being comprised of a rubber-modified high density polyethylene.

4. The roll package according to claim 1 wherein the protective material layer is a laminate having a first layer adhered to a second layer, the first layer being comprised of a metalized polyester, a metalized high density polyethylene, or a metalized polycarbonate, and the second layer being comprised of a medium to low density polyethylene, ethylene vinyl acetate, or an ethylene acrylic acetate.

5. A roll package, comprising:

a spool having a core and a flange disposed at opposite ends of the core; each flange having an outwardly facing surface and an inwardly facing surface, the inwardly facing surface of each flange including a substantially planar portion adjacent an outer edge of the flange and a recessed portion inboard of the substantially planar portion;

a length of web material layer wound about the core between the flanges, said web having an active front side and a back side; and a length of a protective material layer wound substantially entirely alone the backside of said length of web material layer forming a plurality of alternating convolutions of said web material layer and said protective material layer wherein nearest adjacent protective material layers in said plurality of alternating convolutions provide light and moisture vapor barrier protection for said web material layer sandwiched therebetween.

6. The roll package according to claim 5 wherein the protective material layer has a moisture vapor transmission rate of less than about 0.05 grams per one hundred square inches for 24 hours when tested at 100 degree F., 100 percent relative humidity.

7. The roll package according to claim 5 wherein the protective material layer is a laminate having a first layer adhered to a second layer, the first layer being comprised of a compression rolled high density polyethylene, the second layer being comprised of a rubber-modified high density polyethylene.

8. The roll package according to claim 5 wherein the protective material layer is a laminate having a first layer adhered to a second layer, the first layer being comprised of a metalized polyester, a metalized high density polyethylene, or a metalized polycarbonate, and the second layer being comprised of a medium to low density polyethylene, ethylene vinyl acetate, or an ethylene acrylic acetate.

9. The roll package according to claim 5 wherein the substantially planar portion has a surface roughness of less than about 8 microinches.

10. The roll package according to claim 5 wherein the web material layer has a width less than the distance between the substantially planar portions of the flanges, the protective material layer has a width less than the distance between the recessed portions of the flanges, and the protective material layer has a width slightly greater than the distance between substantially planar portions of the flanges.

11. The roll package according to claim 10 wherein edges of the protective material layer abut the substantially planar portion when wound about the length of web material layer such that the edges are held in intimate contact with the substantially planar portion.

12. The roll package according to claim 10 wherein the width of the protective material layer is between about 0.005 and about 0.025 inches greater than the distance between the substantially planar portions of the flanges.

13. The roll package according to claim 12 wherein the width of the protective material layer is about 0.015 inches greater than the distance between the substantially planar portions of the flanges.

14. The roll package according to claim 5 wherein the spool is comprised of a material having a low moisture vapor transmission rate.

15. The roll package according to claim 13 wherein the spool is comprised of a high density polyethylene or a polypropylene.

16. The roll package according to claim 1 wherein said protective material layer has a moisture vapor transmission rate of less than about 0.1 grams per one hundred square inches for 24 hours when tested at 100 degree F., 100 percent relative humidity.

* * * * *

UNITED STATES PATENT AND TRADEMARK OFFICE
CERTIFICATE OF CORRECTION

PATENT NO. : 6,506,547 B1
DATED : January 14, 2003
INVENTOR(S) : Jeffrey C. Robertson et al.

It is certified that error appears in the above-identified patent and that said Letters Patent is hereby corrected as shown below:

Title page,
Insert item -- [*] This patent issued on a continued prosecution application filed under 37 CFR 1.53(d), and is subject to the twenty year patent term provisions of 35 U.S.C. 154(a)(2). --.

Column 4,
Lines 37, 55 and 58, delete "Monax® Plus" and insert -- MONAX® Plus --

Signed and Sealed this

Fifteenth Day of April, 2003

JAMES E. ROGAN
*Director of the United States Patent and Trademark Office*